(12) United States Patent
Kaye et al.

(10) Patent No.: US 8,259,381 B2
(45) Date of Patent: Sep. 4, 2012

(54) PHASE-CHANGE MATERIALS AND OPTICAL LIMITING DEVICES UTILIZING PHASE-CHANGE MATERIALS

(75) Inventors: Anthony Bresenhan Kaye, Herndon, VA (US); Richard Forsberg Haglund, Jr., Brentwood, TN (US)

(73) Assignee: Exelis Inc., McLean, VA (US)

( * ) Notice: Subject to any disclaimer, the term of this patent is extended or adjusted under 35 U.S.C. 154(b) by 487 days.

(21) Appl. No.: 12/479,311

(22) Filed: Jun. 5, 2009

(65) Prior Publication Data

US 2010/0309539 A1 Dec. 9, 2010

(51) Int. Cl.
G02F 1/01 (2006.01)
(52) U.S. Cl. .................................................. 359/279
(58) Field of Classification Search .......... 359/279, 359/280, 281, 245, 248, 254; 436/104
See application file for complete search history.

(56) References Cited

U.S. PATENT DOCUMENTS

| | | | |
|---|---|---|---|
| 6,906,842 B2 | 6/2005 | Agrawal et al. | |
| 2003/0017316 A1 | 1/2003 | Pfaff et al. | |
| 2003/0196454 A1 | 10/2003 | Jin | |
| 2004/0005472 A1 | 1/2004 | Arnaud et al. | |
| 2004/0150818 A1 | 8/2004 | Armstrong et al. | |
| 2006/0170665 A1 | 8/2006 | Morita et al. | |

FOREIGN PATENT DOCUMENTS

| | | |
|---|---|---|
| EP | 1 295 169 B1 | 6/2008 |
| WO | 2008087077 A1 | 7/2008 |

OTHER PUBLICATIONS

E.V. Babkin, et al., "Metal-Insulator Phase Transition in VO2: Influence of Film Thickness and Subtrate", Electronics and Optics, 1987, pp. 11-14.
B. Felde, et al., "Plasmon Excitation in Vanadium Dioxide Films", Elsevier, Thin Solid Films, 1997, pp. 61-65.
P. Jin, et al., "Tungsten Doping into Vanadium Dioxide Thermochromic Films by High-Energy Ion Implantation and Thermal Annealing", Elsevier, Thin Solid Films, 1998, pp. 151-158.
Ningyi Yuan, et al., "The Large Modification of Phase Transition Characteristics of VO2 Films on SiO2/Si Substrates", Elsevier, ScienceDirect, 2006, pp. 1275-1279.
Yan Jiazhen, et al., "Effect of Mo-W Co-doping on Semiconductor-Metal Phase Transition Temperature of Vanadium Dioxide Film", Elsevier, ScienceDirect, 2008, pp. 8554-8558.

(Continued)

*Primary Examiner* — Ricky Mack
*Assistant Examiner* — Tuyen Tra
(74) *Attorney, Agent, or Firm* — Edell, Shapiro & Finnan, LLC

(57) ABSTRACT

An optical limiting structure includes a metal layer with a single metal particle or a plurality of metal particles spaced from each other so as to form an array, where the metal particles have sizes no greater than about 1000 nanometers. A phase-change material layer is disposed adjacent at least a portion of the metal layer, where the phase-change material layer includes a phase-change material. The optical limiting structure is configured to transition from a first optical state to a second optical state, where the optical limiting structure substantially limits transmittance of light of at least one wavelength through the optical limiting structure at the second optical state, and the at least one wavelength at which the optical limiting structure substantially limits transmittance of light is different from any wavelength of light at which transmittance is substantially limited through the phase-change material prior to integration into the optical limiting structure.

32 Claims, 14 Drawing Sheets

OTHER PUBLICATIONS

Justyna K. Ganel, et al., "Gold Helix Photonoic Metamaterial as Broadband Circular Polarizer", Science AAAS, vol. 325, 2009, pp. 1513-1515.

T. Driscoll, et al., "Memory Metamaterials", Science AAAS, vol. 325, 2009, pp. 1518-1521.

International Search Report and Written Opinion received in PCT/US10/32712 dated Jul. 2, 2010.

Weiping Wang, et al., "Dynamic Optical Limiting Experiments on Vanadium Dioxide and Vanadium Pentoxide Thin Films Irradiated by a Laser Beam", Applied Optics, vol. 45. No. 14, May 10, 2006, pp. 3378-3381.

R. Lopez, et al., "Pulsed Laser Deposition of Conductive Metallo-Dielectric Optical Filters", Applied Physics, Dec. 20, 2001, pp. 307-310.

Mark Borek, et al., "Pulsed Laser Deposition of Oriented VO2 Thin Films on R-Cut Sapphire Substrates", Appl. Phys. Lett., Dec. 13, 1993, pp. 3288-3290.

R. Lopez, et al., "Enhanced Hysteresis in the Semiconductor-to-Metal Phase Transition of VO2 Precipitates Formed in SiO2 by Ion Implantation", Appl. Phys. Lett., vol. 79, No. 19, Nov. 5, 2001, pp. 3161-3163.

Y. Muraoka et al., "Metal-Insulator Transition of VO2 Thin Films Grown on TiO2 (001) and (110) Substrates", Appl. Phys. Lett., vol. 80, No. 4, Jan. 28, 2002, pp. 583-585.

G.I. Petrov et al., "Raman Microscopy Analysis of Phase Transformation Mechanisms in Vanadium Dioxide", Appl. Phys. Lett., vol. 81, No. 6, Aug. 5, 2002, pp. 1023-1025.

R. Lopez et al., "Switchable Reflectivity on Silicon from a Composite VO2-SiO2 Protecting Layer", Appl. Phys. Lett., vol. 85, No. 8, Aug. 23, 2004, pp. 1410-1412.

J. Rozen et al., "Two-Dimensional Current Percolation in Nanocrystalline Vanadium Dioxide Films", Appl. Phys. Lett., pp. 1-3.

J.Y. Suh, et al., "Modulated Optical Transmission of Subwavelength Hole Arrays in Metal-VO2 Films", Appl. Phys. Lett., Mar. 2006, pp. 1-3.

I. Karakurt, et al., "Transmission Increase Upon Switching of VO2 Thin Films on Microstructured Surfaces", Appl. Phys. Lett., Aug. 2007, pp. 1-3.

Bong-Jun Kim, et al., "Temperature Dependence of the First-Order Metal-Insulator Transition in VO2 and Programmable Critical Temperature Sensor", Appl. Phys. Lett., Jan. 2007, pp. 1-3.

J.S. Lee, et al., "Time-Resolved Visualization of the Heat Flow in VO2/Ai2O3 Films", Appl. Phy. Lett., Jan. 2007, pp. 1-3.

Gang Xu, et al., Thickness Dependence of Optical Properties of VO2 Thin Films Epitaxially Grown on Sapphire (0 0 0 1), Applied Surface Science, Jan. 2005, pp. 449-452.

S. Lysenko, et al., "Light-Induced Ultrafast Phase Transitions in VO2 Thin Film", Applied Surface Science, Jan. 2006, pp. 5512-5515.

Jesse H. Day, "Thermochromism of Inorganic Compounds", Chemical Reviews, vol. 68, No. 6, Nov. 25, 1968, pp. 649-657.

Feliks Chudnovskiy, et al., "Switching Device Based on First-Order Metal-Insulator Transition Induced by External Electric Field", Wiley Interscience, 2002, pp. 1-8.

O. Ya. Berezina, et al., "Metal-Semiconductor Transition in Nonstoichiometric Vanadium Dioxide Films", Inorganic Materials, 2007, vol. 43, No. 5, pp. 505-511.

Changhong Chen, et al., "Micromachined Uncooled IR Bolometer Linear Array Using Vo2 Thin Films", Int'l. Journal of Infrared and Millimeter Waves, vol. 22, No. 1, 2001, pp. 53-58.

Shai Chen, et al., "Phase Transition VO2 Thin Films for Optical Switches", Int'l Journal of Infrared and Millimeter Waves, vol. 25, No. 1, Jan. 2004, pp. 157-163.

P.J. Hood et al., "Millimeter-Wave Dielectric Properties of Epitaxial Vanadium Dioxide Thin Films", J. Appl. Phys. 70, Jul. 1, 1991, pp. 376-381.

Michael F. Becker, et al., "Femtosecond Laser Excitation Dynamics of the Semiconductor-Metal Phase Transition in VO2", J. Appl. Phys., Mar. 1, 1996, pp. 2404-2408.

J.H. Suh, et al., "Semiconductor to Metal Phase Transition in the Nucleation and Growth of VO2 Nanoparticles and Thin Films", Journal of Applied Physics, vol. 96, No. 2, Jul. 15, 2004, pp. 1209-1213.

S.A. Pauli, et al., "X-Ray Diffraction Studies of the Growth of Vanadium Dioxide Nanoparticles", Journal of Applied Physics, 2007, pp. 1-6.

A. Ilinski, et al., "Variations in Optical Reflectivity in the Semiconductor-Metal Phase Transition of Vanadium Dioxide", Journal of Non-Crystalline Solids, 2004, pp. 266-268.

J.Y. Suh, et al., "Modulation of the Gold Particle-Plasmon Resonance by the Metal-Semiconductor Transition of Vanadium Dioxide", Journal of Optics, 2008, pp. 1-6.

M. Soltani, et al, "Micro-Optical Switch Device Based on Semiconductor-to-Metallic Phase Transition Characteristics of W-doped VO2 Smart Coatings", J. Vac. Sci. Tech., Jul./Aug. 2007, pp. 971-975.

E. Cavanna, et al, "Optical Switching of Au-Doped VO2 Sol-Gel Films", Materials Research Bulletin, vol. 34, No. 2, 1999, pp. 167-177.

M. Maaza, et al., "Direct Production of Thermochromic VO2 Thin Film Coatings by Pulsed Laser Ablation", Elsevier, Optical Materials, 2000, pp. 41-45.

M. Maaza et al., "Thermal Induced Tunability of Surface Plasmon Resonance in Au-VO2 Nano-Photonics", Elsevier, Optics Communications, 2005, pp. 188-195.

Hongchen Wang, et al., "Fabrication of VO2 Films with Low Transition Temperature for Optical Switching Applications", Elsevier, Optics Communications, 2005, pp. 305-309.

T. Ben-Messaoud, et al., "High Contrast Optical Switching in Vanadium Dioxide Thin Films", Elsevier, Optics Communications, 2008, pp. 1-4.

R. Lopez, et al., "Temperature-Controlled Surface Plasmon Resonance in VO2 Nanorods", Optics Letters, Aug. 1, 2002, vol. 27, No. 15, pp. 1327-1329.

G.I. Petrov, et al., "Nonlinear Optical Microscopy Analysis of Ultrafast Phase Transformation in Vanadium Dioxide", Optics Letters, Apr. 15, 2002, vol. 27, No. 8, pp. 655-657.

Matteo Rini, et al., "Photoinduced Phase Transition in VO2 Nanocrystals: Ultrafast Control of Surface-Plasmon Resonance", Optics Letters, vol. 30, No. 5, Mar. 1, 2005, pp. 558-560.

H.S. Choi, et al., "Mid-Infrared Properties of a VO2 Film Near the Metal-Insulator Transition", Physical Review, vol. 54, No. 7, Aug. 15, 1996, pp. 4621-4628.

R. Lopez, et al., "Size Effects in the Structural Phase Transition of VO2 Nanoparticles", Physical Review B, vol. 65, 200, pp. 1-5.

A. Cavalleri, et al., "Picosecond Soft X-Ray Absorption Measurement of the Photoinduced Insulator-to-Metal Transition in VO2", Physical Review, 2004, pp. 1-4.

A. Cavalleri, et al., "Evidence for a Structurally-Driven Insulator-to-Metal Transition in VO2: A View from the Ultrafast Timescale", Physical Review, 2004, pp. 1-4.

E.U. Donev, et al, "Optical Properties of Subwavelength Hole Arrays in Vanadium Dioxide Thin Films", Physical Review, 2006, pp. 1-4.

F.J. Morin, "Oxides Which Show a Metal-To-Insulator Transition at the Neel Temperature", Physical Review Letters, vol. 3, No. 1, Jul. 1, 1959, pp. 34-36.

A.S. Barker, et al., "Infrared Optical Properties of Vanadium Dioxide above and Below the Transition Temperature", Physical Review Letters, vol. 17, No. 26, Dec. 26, 1966, pp. 1286-1289.

Ramakant Srivastava et al., "Raman Spectrum of Semiconducting and Metallic VO2", Physical Review Letters, vol. 27, No. 11, Sep. 13, 1971, pp. 727-730.

A. Cavalleri, et al., "Femtosecond Structural Dynamics in VO2 During an Ultrafast Solid-Solid Phase Transition", Physical Review Letters, vol. 87, No. 23, Dec. 3, 2001, pp. 1-4.

R. Lopez, et al., "Size-Dependent Optical Properties of VO2 Nanoparticle Arrays", Physical Review Letters, vol. 93, No. 17, Oct. 22, 2004, pp. 1-4.

A. Cavalleri, et al., "Band-Selective Measurements of Electron Dynamics in VO2 Using Femtosecond Near-Edge X-Ray Absorption", Physical Review Letters, Aug. 5, 2005, pp. 1-4.

C. Kubler, et al, "Coherent Structural Dynamics and Electronic Correlations During an Ultrafast Insulator-to-Metal Phase Transition in VO2", Physical Review Letters, Sep. 14, 2007, pp. 1-4.

Jyrki Lappalainen, et al, "Microstructure Dependent Switching Properties of VO2 Thin Films", Elsevier, ScienceDirect, 2007, pp. 250-255.

Andriy Romanyuk, et al, "Temperature-Induced Metal-Semiconductor Transition in W-doped VO2 Films Studied by Photoelectron Spectroscopy", Elsevier, ScienceDirect, 2007, pp. 1831-1835.

B. Fisher et al., "The Metal-Semiconductor Transition Temperatures in Vanadium Oxides", Solid State Communications, vol. 33, 1979, pp. 965-967.

V.A. Klimov et al., "Hysteresis Loop Construction for the Metal-Semiconductor Phase Transition in Vanadium Dioxide Films", Solid-State Electronics, 2002, pp. 1134-1139.

Xu et al., "Surface Plasmon Resonance of Silver Nanoparticles on Vanadium Dioxide", J. Phys. Chem. B, vol. 110, No. 5, 2006, pp. 2051-2056.

Xu et al., "Tunable Optical Properties of nano-AU on Vanadium Dioxide", Optics Communications 282, 2009, pp. 896-902.

PHASE-CHANGE MATERIALS AND OPTICAL LIMITING DEVICES UTILIZING PHASE-CHANGE MATERIALS

BACKGROUND

Some phase-change materials have the ability to change colors and/or to reflect, block, or limit the transmittance of light at different wavelengths based upon changes in temperature and/or light absorbed by the phase-change materials. This facilitates the use of certain phase-change materials for certain light-blocking applications.

One type of phase-change material that has been studied for some time is vanadium oxide. Vanadium oxide is thermochromic material that has a variety of different oxide forms, including $VO_2$ and $V_2O_3$. Vanadium dioxide, $VO_2$, undergoes a reversible transition from a semiconductor phase (where the $VO_2$ has a monoclinic crystal structure) to a metal phase (where the $VO_2$ has a tetragonal crystal structure) at a critical temperature of about 68° C. The transitional phase change at this critical temperature results in the $VO_2$ exhibiting a rapid change in electrical and optical properties. At this temperature-induced phase transition, $VO_2$ acts as an optical "blocker" or barrier that substantially limits the transmittance of light at near-infrared (near-IR) wavelengths of about 1.2 micrometers.

Research has been conducted for exploring possibilities of utilizing vanadium dioxide in optical switching applications (e.g., as window coatings or optical shutters) due to its ability to limit the transmittance of light at near-IR wavelengths. In addition, certain dopants, such as tungsten and chromium, can be added to vanadium dioxide to lower its critical phase transition temperature to temperatures as low or even lower than room temperature (about 27° C.), thus enhancing the applications and environments in which vanadium dioxide may be used as an infrared light blocking material.

It would be desirable to provide an optical limiting material such as vanadium oxide or some other phase-change material that can be utilized as an optical switch to block or substantially limit the transmittance of light for a variety of different applications including light blocking applications at wavelengths shifted from the IR or near-IR range.

SUMMARY

In accordance with an embodiment of the present invention, an optical limiting structure comprises a metal layer comprising at least one metal particle having a size no greater than about 1000 nanometers. The optical limiting structure further comprises a phase-change material layer disposed adjacent at least a portion of the metal layer, where the phase-change material layer comprises a phase-change material. The optical properties of the optical limiting structure are modified in relation to optical properties of the phase-change material by itself (i.e., prior to integration into the optical limiting structure). In particular, the optical limiting structure is configured to transition from a first optical state to a second optical state, where the optical limiting structure substantially limits transmittance of light of at least one wavelength through the optical limiting structure at the second optical state, and the at least one wavelength at which the optical limiting structure substantially limits transmittance of light is different from any wavelength of light at which transmittance is substantially limited through the phase-change material by itself.

In accordance with another embodiment of the invention, a method of providing an optical limiting structure comprises providing a metal layer comprising one metal particle or, alternatively, a plurality of metal particles spaced from each other and forming an array, the metal particles having sizes no greater than about 1000 nanometers. The method further comprises depositing a phase-change material layer over the metal layer, the phase-change material layer comprising a phase-change material that transitions from a first optical state to a second optical state, where transmittance of light at one or more wavelengths through the phase-change material is lower at the second optical state in relation to the first optical state. The optical limiting structure transitions when heated above the critical temperature from a first optical state to a second optical state, with a transmittance of light at a second wavelength through the optical limiting structure being lower at the second optical state of the optical limiting structure in relation to the first optical state of the optical limiting structure, and the second wavelength is different from each wavelength at which the phase-change material exhibits lower transmittance when transitioning from the first optical state of the phase-change material to the second optical state of the phase-change material.

The optical limiting structure of the present invention provides a number of advantages including, without limitation, the advantage of blue-shifting the wavelength at which the structure is capable of blocking or substantially limiting the transmittance of light in relation to the optical limiting ability of the phase-change material by itself. This facilitates a wide variety of applications for use of the optical limiting structure in which it is desirable to block, reduce transmission or filter light at wavelengths that otherwise cannot be accomplished utilizing the phase-change material by itself (e.g., limiting transmittance of light at selected wavelengths within the visible light range).

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

Figure 1:
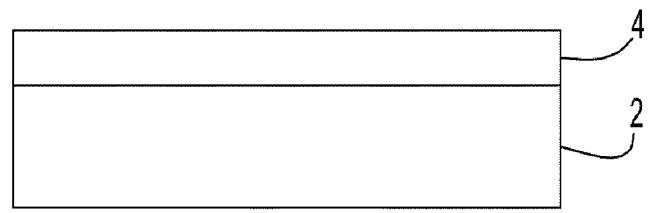
FIGS. 1-6 schematically depict the formation of an optical limiting structure using a focused ion beam lithography process in accordance with the present invention.

In accordance with the present invention, an optical limiting structure comprises a phase-change material layer and a metal layer, in which the optical limiting structure provides the functionality of an optical switch to block or substantially limit the transmittance of light at selected wavelengths through the structure based upon a change in temperature of the phase-change material layer.

The phase-change material layer can be formed with one or more thermochromic materials and/or one or more photochromic materials (i.e., one or more thermochromic materials, one or more photochromic materials, or combinations of one or more thermochromic materials and one or more photochromic materials). In an example embodiment, the phase-change material utilized to form the phase-changing material layer is vanadium oxide, which is a thermochromic material and refers to a number of different forms of vanadium oxides including, without limitation, $VO_2$ and $V_2O_3$. However, the present invention is not limited to the use of vanadium oxides but instead can be formed from any one or combination of phase-change materials which undergo optical property changes when subjected to temperature or light changes so as to block or substantially limit transmittance of light at one or more selected wavelengths through the phase-change material layer.

Thermochromic materials undergo phase transitions upon being heated above a critical temperature. For example, as noted above, vanadium dioxide ($VO_2$) undergoes a phase transition from a semiconductor state to a metal state upon being heated to a temperature above about 68° C. Examples of suitable thermochromic materials that can be used to form the phase-change material layer include, without limitation, metal oxide-based materials such as $VO_2$, $V_2O_3$, $Ti_2O_3$, $NiS_{2-y}$, $Se_y$, $LaCoO_3$, $PrNiO_3$, $Cd_2Os_2O_7$, $NdNiO_3$, $Tl_2Ru_2O_7$, $NiS$, $BaCo_{1-y}Ni_yS_2$, $Ca_{1-y}Sr_yVO_3$, $PrRu_4P_{12}$, $BaVS_3$, $EuB_6$, $Fe_3O_4$, $La_{1-y}Ca_yMnO_3$, $La_{2-2y}Sr_{1+2y}Mn_2O_7$, $Ti_4O_7$ and $La_2NiO_4$ and any combinations of these compounds (where $y \leq 1$). Other suitable thermochromic materials that can be used to form the phase-change material layer are polymers including, without limitation, azobenzene-containing polydiacetylenes, polyvinylidene fluoride, polyvinyl acetate, polyvinyl phenylene, polystyrene sulfonate, and polyanilines (e.g., polyanilines doped into synthetic opal nanostructures). Still other suitable materials may be nanostructured polymers, such as diblock (poly[styrene-b-isoprene] or PS-b-PI) and triblock (the rod-coil copolymer poly[poly(N-isopropylacrylamide)-b-polyfluorene-b-poly(N-isopropylacrylamide)]) copolymers.

Thermo- or photochromic materials undergo phase transitions upon being subjected to heat or light at selected wavelengths. The most well-known of these materials are transition-metal oxides (e.g., $WO_3$, $V_2O_3$) and mixed oxides of the manganite type $RE_xAE_{1-x}MnO_3$, where RE is a rare-earth metal (e.g., lanthanum, praseodymium) and AE is an alkaline-earth metal (e.g., Ca). However, there is a large literature showing phase transitions that may possibly be exploitable in similar materials, such as intermetallics (NiAl) and more complex oxide composites.

The metal layer is formed from one nanozised particle or, alternatively, a plurality of nanosized metal particles, where the metal particles comprise nanosized structures having cross-sectional dimensions (e.g., length, width, thickness and/or diameter dimensions) on the order of no greater than about 1000 nanometers (nm), preferably no greater than about 500 nm, and more preferably no greater than about 300 nm. In a preferred embodiment, the metal particles can have cross-sectional dimensions ranging from about 20 nm to about 250 nm. The metal particles are arranged in a pattern or array defining the metal layer, and a film or thin layer of the phase-change material is formed over the array of metal particles as described below. Suitable metals that can be used to form the metal layer include, without limitation, noble metals such as gold, platinum, palladium and silver, base metals such as copper and aluminum, and any combinations, alloys (e.g., a gold/silver alloy, a gold/copper alloy, etc.), and/or oxides (e.g., silver oxide) of such metals. The term "metal particle", as generally used herein and unless specified otherwise, refers to a structure including at least one of a metal, an oxide of the metal and an alloy of the metal.

Any suitable process can be utilized to form a selected pattern or array of metal particles on a substrate during formation of the optical limiting device. For example, photolithography techniques can be used to form a channeled pattern of voids within a resist, followed by deposition of the metal within the channeled pattern of voids and removal of the resist. Techniques such as focused ion beam (FIB) lithography and electron beam (EB) lithography are particularly useful, since such techniques facilitate the formation of any selected pattern with a high level of accuracy and precision. Alternatively, any other suitable process, such as a stamping, self-assembling, colloid-mask lithography or imprinting process, can also be used to form an array of nanosized metal particles. As described in further detail below, different arrays of nanosized particles can be provided in which the nanosized particles have a variety of different geometric shapes, dimensions, spacings, and/or orientations to form optical limiting structures capable of blocking or substantially limiting transmittance of light through the optical limiting structures at a variety of different wavelength ranges.

The metal layer comprising the array of nanosized metal particles is at least partially covered by a thin film layer of the phase-change material. The phase-change material can be deposited over the metal particles in any suitable manner, such as by chemical vapor deposition or physical vapor deposition (e.g., pulsed laser deposition). Preferably, the phase-change material layer or film is formed having a thickness no greater than about 100 nm. For example, a thin film of the phase-change material can be formed over an array of metal particles using a pulsed laser deposition (PLD) or other similar process having a thickness in the range from about 10 nm to about 50 nm.

The optical limiting device can be formed with any selected combinations of metal layers and/or phase-change material layers. In one example, an optical limiting structure can be formed with a phase-change material layer disposed over a metal layer comprising an array of metal nanoparticles. In another example, an optical limiting structure can be formed with a metal layer disposed over a phase-change material layer. In a further example, an optical limiting structure can be formed with a metal layer comprising an array of metal nanoparticles disposed or "sandwiched" between two films or layers of phase-change material, where each phase-change material layer can include the same or different one or combination of phase-change materials (i.e., thermochromic and/or photochromic materials). In still another example, the phase change material can be formed over surface portions of nanosized metal particles, where the spaces between metal particles remain uncovered by the phase change material such that a series of phase-change material layers are formed either over individual particles (so as to form a "hat" or partial covering over a portion of each metal particle) or over sets of particles with uncovered spaces remaining between the covered particles or the sets of covered particles.

Thermochromic materials used to form the phase-change material layer can be provided with any one or combination of suitable dopants. Certain dopants can be provided within the thermochromic material to effect a shift or change in the critical temperature at which the thermochromic material transitions so as to block or limit transmittance of light at one or more selected wavelengths through the phase-change material layer. Other dopants can influence the transmissivity and/or other optical properties of the phase-change material. Examples of suitable dopants include, without limitation, tungsten, fluorine, titanium, chromium, and combinations thereof, where the dopant or combinations of dopants are provided within the thermochromic material at concentrations ranging from about 0.05 atomic % to about 5 atomic %. For example, $VO_2$ can be doped with a dopant such as tungsten to lower the critical temperature (at which the $VO_2$ compound transitions from semiconductor phase to metal phase) from about 68° C. to temperatures as low as room temperature (e.g., about 27° C.) or lower.

The formation of a series of two or more layers comprising at least one phase-change material layer formed over a metal layer comprising an array of nanosized metal particles results in an enhanced optical limiting device or structure that shifts the wavelength range at which the structure is capable of blocking or substantially limiting the transmittance of light in relation to the wavelength (or range of wavelengths) at which the phase-change material layer by itself is capable of substantially limiting the transmittance of light. As used herein, substantially limiting the transmittance of light through a structure including a phase-change material refers to the structure having certain optical properties (e.g., due to a phase transition of the phase-change material within the structure) such that the structure limits the transmittance of light at a specified wavelength through the structure to a value of no greater than about one part in one million (i.e., an optical density of at least about 6). Transmittance is defined herein as (intensity of light emerging from the structure at the specified wavelength)/(intensity of the incident light directed toward the structure at the specified wavelength). The substantial limiting of light of a particular wavelength or range of wavelengths can be determined, for example, by measured extinction spectra (representing the extinction of transmittance through the structure) as a function of wavelength, where a peak in the extinction spectral data plotted vs. wavelength represents the wavelength range at which the structure substantially limits the transmittance of light.

In accordance with the present invention, a wavelength or wavelength range at which the combined phase-change and metal particle layered structure can block or substantially limit the transmittance of light can be shifted (e.g., blue-shifted, which refers to a shortening of the wavelength) in the region of the spectrum bounded from about 250 nm to about 2500 nm.

For example, as noted above, $VO_2$ is capable of substantially limiting the transmittance of near-IR light at a wavelength in the range of about 1200 nm (1.2 µm) upon being heated above a critical temperature of about 68° C. (which is the point at which $VO_2$ transitions between semiconductor and metal states) with no doping of the $VO_2$. In accordance with the present invention, an optical limiting structure or device can be formed including a thin film or layer of $VO_2$ deposited over an array of nanosized metal particles (e.g., gold particles or any other one or combination of metals as described above) in which the structure is capable of substantially limiting the transmittance of light at blue-shifted wavelengths shorter or less than 1200 nm when the $VO_2$ transitions from a semiconductor state to a metal state, including the limiting of the transmittance of light in the visible range (e.g., wavelengths in the range from about 400 to about 800 nm) and even in the near-ultraviolet range (e.g., wavelengths lower than about 400 nm).

For example, using an array of round or circular shaped gold particles and a $VO_2$ layer deposited over the metal layer, a resultant structure can be formed that substantially limits the transmittance of light through the structure at wavelengths shifted by at least about 150 nm (preferably about 250 nm or more) from 1200 nm. In particular, an optical limiting structure can be formed including a thin film or layer of $VO_2$ deposited over an array of nanosized metal particles, in which the optical limiting device can substantially limit the transmittance of light through the structure at wavelengths ranging from about 500 nm to about 560 nm (e.g., at about 530 nm±30 nm). In other words, the optical limiting structure is configured to shift the light blocking or limiting properties of the structure to the visible light spectrum including the green light region. Optical limiting structures can also be formed so as to substantially limit the transmittance of light at wavelengths in the blue light region (e.g., at wavelengths in the range from about 450 nm to about 500 nm).

While not being bound by any particular theory, it is believed that the combination of the surface plasmon resonance that is generated by the nanosized metal particles forming the metal layer with the physical properties of the phase-change material layer that covers and that is adjacent or in close proximity (within about 20 nm) in relation to the metal particle layer results in a wavelength "tuning" at which the transmittance of light is effectively blocked or substantially limited through an optical limiting structure formed by the combination of the metal and phase-change material layers. Therefore, an optical limiting structure can be formed in accordance with the present invention that includes a phase-change material such as $VO_2$ (which typically is capable of blocking or substantially limiting the transmittance of light in the near-IR range) in which the light blocking capabilities of the optical limiting structure are blue-shifted (e.g., to the visible and/or UV wavelength ranges, such as a shift to the green light spectrum and/or the blue light spectrum) based upon the light blocking requirements for a particular application.

A number of factors can control the wavelength "tuning" for blocking or substantially limiting transmittance of light by the optical limiting structure. Examples of such factors which can control such a shift in wavelength and resultant ability of the optical limiting structure to block or substantially limit transmittance of light include, without limitation, selection of one or more combinations of different phase-change materials and/or one or more different metals used to form the layered structure, size and arrangement of metal particles within the array forming the metal layer, thickness of the phase-change material layer(s), arrangement of arrays within arrays of particles, arrangement of particles having varying shapes and sizes within arrays, and number/variety of phase-change and/or metal layers used to form the layered structure. Thus, optical limiting devices can be formed in accordance with the invention that are tailored to blocking or substantially limiting transmittance of light of different wavelengths based upon the requirements or specifications in which the devices are to be used.

The combination of metal layer comprising nanosized metal particles with phase-change material layer also increases the optical contrast of the optical limiting structure in relation to a phase-change material by itself (i.e., use of the phase-change material without the metal layer). For example, a $VO_2$ layer or structure displays a much lower optical contrast in relation to an optical limiting structure which includes the same $VO_2$ layer formed over a metal layer comprising an array of nanosized metal particles (e.g., gold particles) at certain wavelengths.

An example embodiment of forming an optical limiting structure or device utilizing a lithography process in accordance with the invention is now described with reference to FIGS. 1-6. In this example, an optical limiting structure is formed with a $VO_2$ layer covering a metal layer comprising an array of nanosized gold particles. However, it is noted that the formation techniques described herein are also applicable to other optical limiting structures formed using different phase-change materials and/or different metals. In addition, as noted above, other manufacturing techniques (e.g., stamping or imprinting processes) can also be used to form the optical limiting structure.

Referring to FIG. 1, a substrate is provided including a glass layer 2 with an indium tin oxide (ITO) layer 4 formed over the glass layer 2. Alternatively, it is noted that any other suitable substrate layer may also be provided for forming the metal particle array. The ITO layer can be about 10 nm to about 20 nm in thickness and provides a thin conductive layer for the lithography process. A focused ion beam (FIB) lithography process is used to form an array of nanosized gold particles on the substrate. In particular, the FIB lithography is performed using a FEI/Philips FIB200 focused ion beam (FIB) writer, based on a liquid $Ga^+$ ion source operating at 30 kV. A software interface of the FIB facilitates the input of a variety of different lithographic patterns and control of ion-beam current on a pixel-by-pixel basis.

Figure 2:
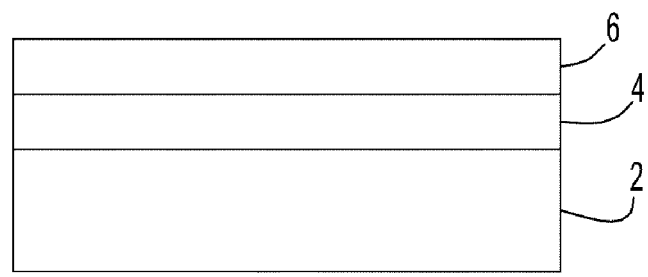

A solution of poly-(methyl methacrylate) (PMMA; standard molecular weight 950 K) in anisole (1.7 wt %) is spun onto the substrate including glass layer 2 and ITO layer 4 in two consecutive stages (first at 500 rpm for about 5 seconds, then at 4000 rpm for about 45 seconds) and heated on a hot plate at about 180° C. for 1 minute to obtain a PMMA layer 6 having a uniform thickness of about 50 nm to about 60 nm (FIG. 2). Preferably, the thickness of the PMMA layer is chosen to be at least three times the desired thickness of the nanosized metal particle layer in order to achieve a high quality lift-off of the PMMA layer after the formation of the metal layer. The $Ga^+$ beam is focused to a nominal beam diameter of 8 nm to create the pattern of pixel dot arrays on the PMMA (e.g., beam current can be set at 1 pA, and dwell time per dot can be 80 µs).

Figure 3:
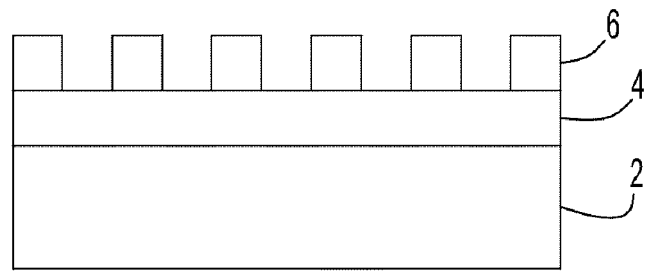
Figure 4:
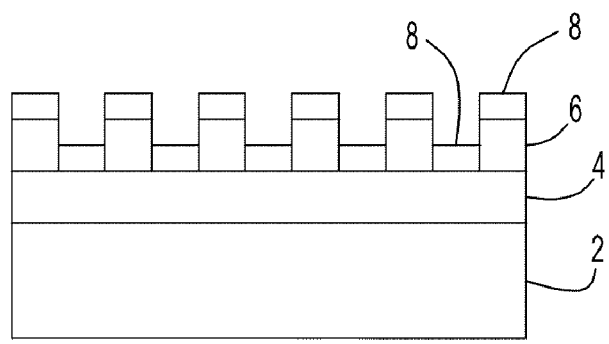
Figure 5:
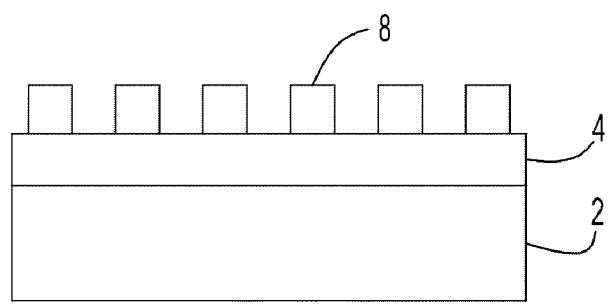

The exposed PMMA is developed in a 1:3 methyl isobutyl ketone and isopropyl alcohol mixture and the irradiated portions of the PMMA layer 6 are then removed, leaving a PMMA patterned resist structure 6 on the substrate (FIG. 3). A gold layer 8 is then deposited (e.g., using a conventional or other suitable physical vapor deposition techniques) over the PMMA patterned structure 6 (FIG. 4). The gold layer can be deposited with a uniform thickness of about 20 nm. After deposition of the gold layer 8, the PMMA resist structure 6 is removed using any conventional or other suitable "lift-off" procedure using a commercially available solvent. This results in the remaining metal layer 8 comprising nanosized gold particles arranged in a desired array and having suitable spacings, dimensions and geometric shapes (FIG. 5).

Using focused-ion-beam (FIB: 30-keV $Ga^+$) lithography in a PMMA mask (e.g., 60 nm thick), followed by vapor deposition of gold (e.g., about a 20 nm thickness) and conventional or other suitable lift-off techniques, arrays of gold nanosized particles of various sizes and shapes can be formed including, without limitations, round and/or ellipsoidal (e.g., 3:1 aspect ratio) cylindrical disk structures, multi-faceted structures (e.g., square, rectangular structures, or other polygon shaped structures), spiral shaped structures, irregular and/or asymmetrical shaped structures, etc. Thus, a variety of arrays of metal particles having varying sizes and shapes can be formed using this process. As noted above, metal particles can be formed having cross-sectional dimensions in the range from about 20 nm to about 250 nm.

A similar process for forming a nanosized metal particle array using a PMMA mask can be achieved with electron-beam lithography, although the interaction of electrons with the photoresist (PMMA) is different. Electrons are capable of penetrating deeper into the PMMA resist than the $Ga^+$ ions in the FIB lithography process, thus requiring more electrons to achieve proper exposure but increasing resolution considerably in relation to FIB lithography. Particle shapes and sizes can therefore be more reproducible and better controlled using electron-beam lithography, allowing for a more precise or fine tuning of the optical properties of the layered optical limiting structure. The resist parameters (e.g., PMMA thickness and development times) used for electron-beam lithography are substantially similar to that of FIB lithography. Example beam currents that can be used for electron-beam lithography are approximately 11 pA with an area dosage of 100 µC/cm² at 10 kV. Dosage and accelerating voltage requirements depend on the resist thickness and desired resolution.

Figure 6:
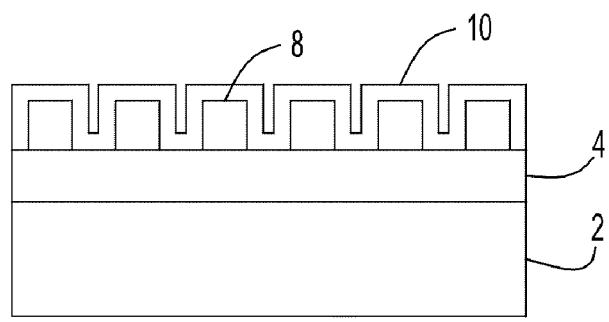

A $VO_2$ layer 10 is formed over the metal layer 8 comprising the array of nanosized gold particles by pulsed-laser deposition followed by thermal oxidation of the deposited layer (FIG. 6). First, a beam from a KrF excimer laser ($\lambda$=248 nm) is focused onto a vanadium target at a fluence of about 4 J/cm² to deposit a sub-stoichiometric vanadium oxide ($VO_{\sim 1.7}$). The sample is then annealed at 450° C. under 250 mTorr of oxygen gas for about 40 minutes to convert the amorphous film into stoichiometric, crystalline $VO_2$. The formed $VO_2$ layer 10 has a thickness of about 50 nm. However, the pulsed-laser deposition process can be controlled so as to form the $VO_2$ layer having any desired thickness (preferably within the range from about 10 nm to about 50 nm). In addition, the $VO_2$ layer can be doped with any one or combination of the previously noted dopants so as to lower the critical temperature at which the $VO_2$ layer reversibly transitions to having different optical properties. While the $VO_2$ layer shown in FIG. 6 is disposed substantially entirely over the metal layer, it is noted that the $VO_2$ layer can alternatively be formed over only portions of the metal layer or even over individual metal particles in the array (e.g., to form a "hat" or partial covering over individual metal particles), while leaving portions of the array exposed (i.e., not covered by the $VO_2$ layer).

Optical limiting structures formed in the manner described above, including a metal layer comprising an array of nanosized gold particles and a $VO_2$ layer deposited over the metal layer, have been tested and determined to block or substantially limit transmittance of light at wavelengths significantly shorter or less than 1200 µm, where the optical limiting structure is capable of blocking or substantially limiting the transmittance of light at wavelengths in the visible range (about 800 nm to about 400 nm) and/or UV range (less than 400 nm).

Figure 7:
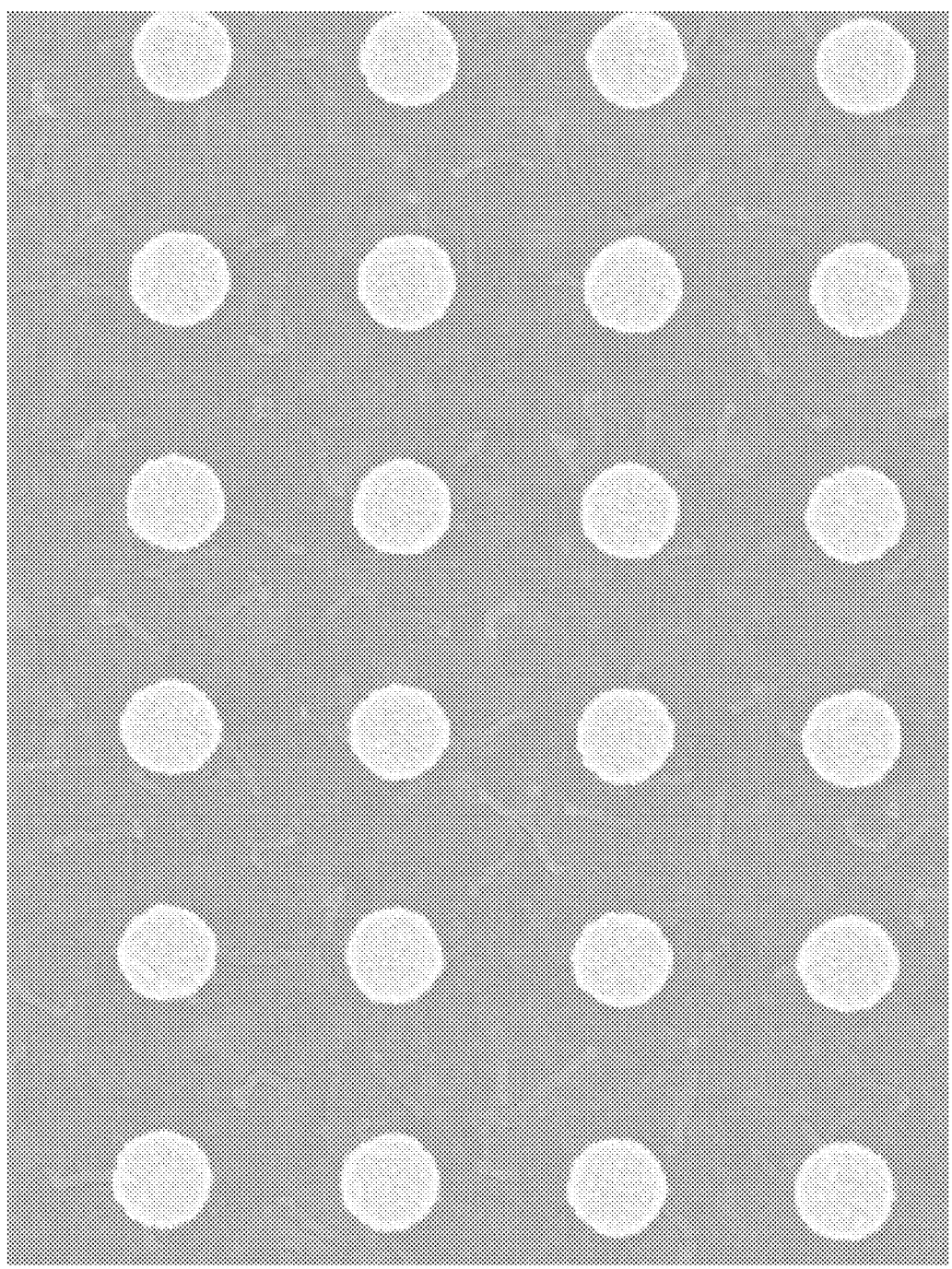
FIGS. 7-17 are scanning electron micrograph images of different arrays of nanosized metal particles which can be used to form the metal layer of an optical limiting structure in accordance with the present invention.
Figure 8:
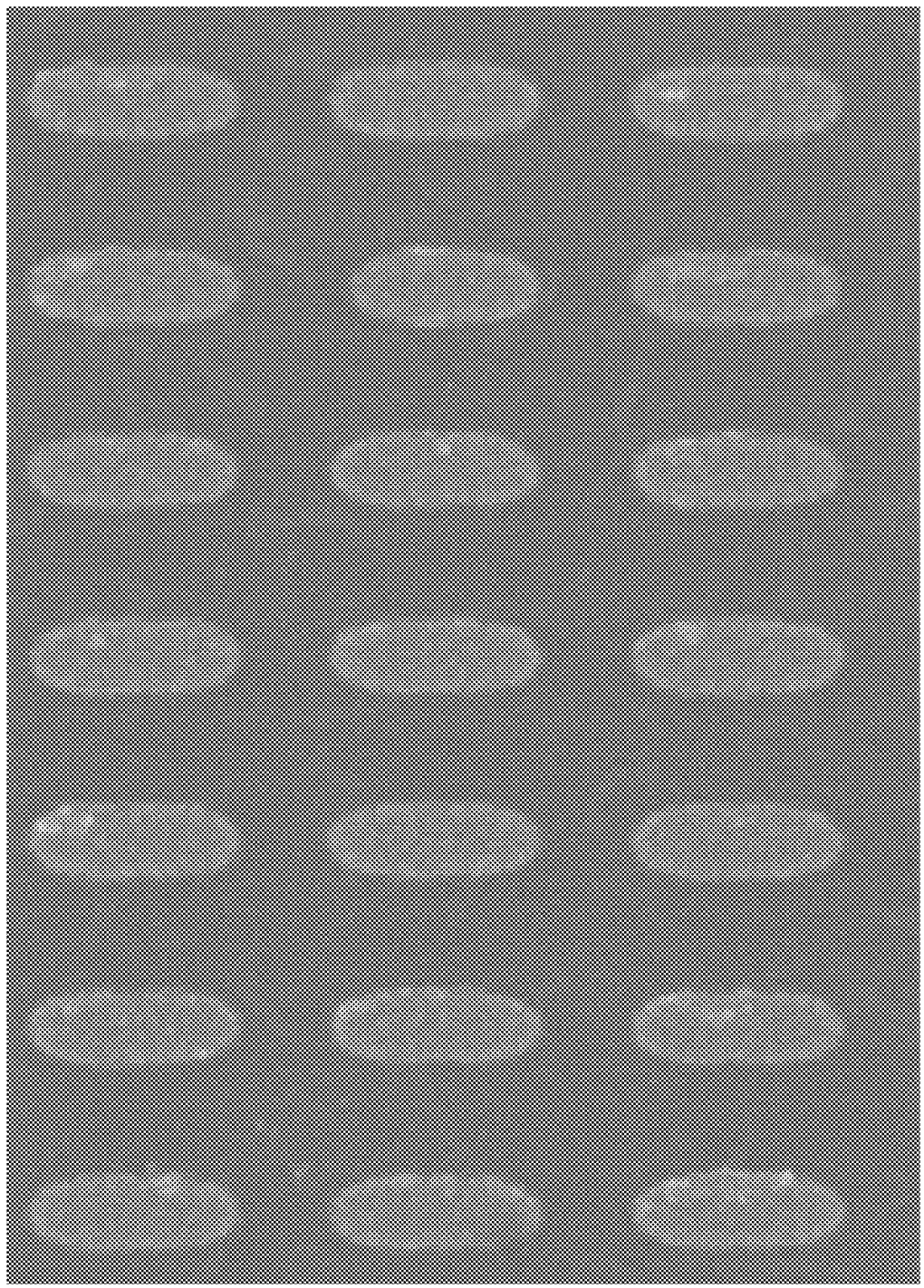

As noted above, the arrangement, size and geometric shapes of the nanosized metal particles in the array have an effect on the wavelength "tuning" of the optical limiting structure formed according to the invention. Two examples of arrays of nanosized metal particles that can be formed using an FIB or EB lithography process such as that described above are shown in the scanning-electron micrographs (SEMs) of FIGS. 7 and 8, where the gold particles of the array shown in FIG. 7 are round and substantially uniform in size, with each particle having a diameter of about 188 nm and each gold particle being substantially uniformly spaced from its nearest neighboring particles by about 267 nm. The gold particles of the array shown in FIG. 8 are elliptical and substantially uniform in size, with each gold particle having a longitudinal or major axis dimension of about 308 nm and a width or minor axis dimension of about 115 nm, and the elliptical gold particles are also substantially uniformly spaced from each other.

Figure 9:
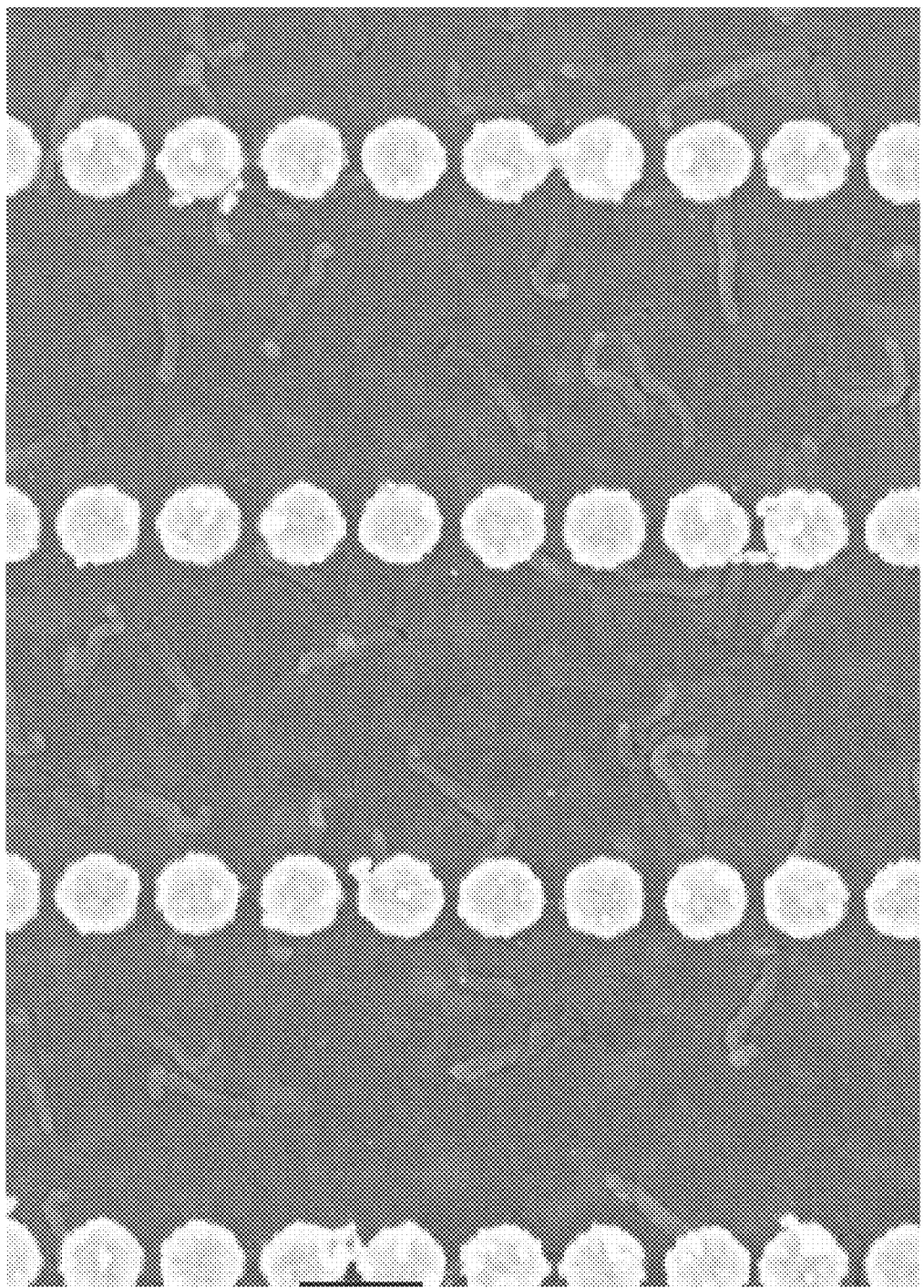

A wide variety of different arrays of nanosized metal particles can also be formed. For example, the SEM photograph of FIG. 9 depicts an array of gold particles including groups of round particles arranged in linearly extending rows or "chains", where the rows or "chains" combine to form the array. The particles have substantially uniform diameters (e.g., diameters of about 107 nm). In addition, the particles are spaced closer to each other in each linear row or "chain" in relation to the spacing between each row or "chain." In the example embodiment depicted in FIG. 9, particles are spaced from each other in each row a distance of about 23 nm, while the spacing between two or more linearly arranged rows of particles is about 396 nm. The size and geometric shape of the particles as well as the particle spacings within rows and distance between rows can also be adjusted based upon a particular application. In addition, the rows of particles can extend in patterns other than linear patterns including, without limitation, zig-zag patterns, spiral patterns, S-shaped or other curved patterns, etc.

An array of circular, disk-shaped gold nanoparticles was formed having a configuration similar to that shown in FIG. 7. However, each disk-shaped nanoparticle had a diameter of about 20 nm and a thickness of about 20 nm. Spacing ranged from 60 to 200 nm. After depositing a 20 nm thick layer of $VO_2$ over the gold nanosized particle array (in a manner similar to the example described above), the two-layered optical limiting structure was tested by heating the structure above the critical temperature of $VO_2$ (about 68° C.). It was determined that the structure substantially limited the transmittance of green light through the structure. In particular, the optical limiting structure substantially limited the transmittance of light through the structure at a wavelength of at least 532 nm±30 nm (i.e., including wavelengths within the range from about 502 nm to about 562 nm).

Figure 10:
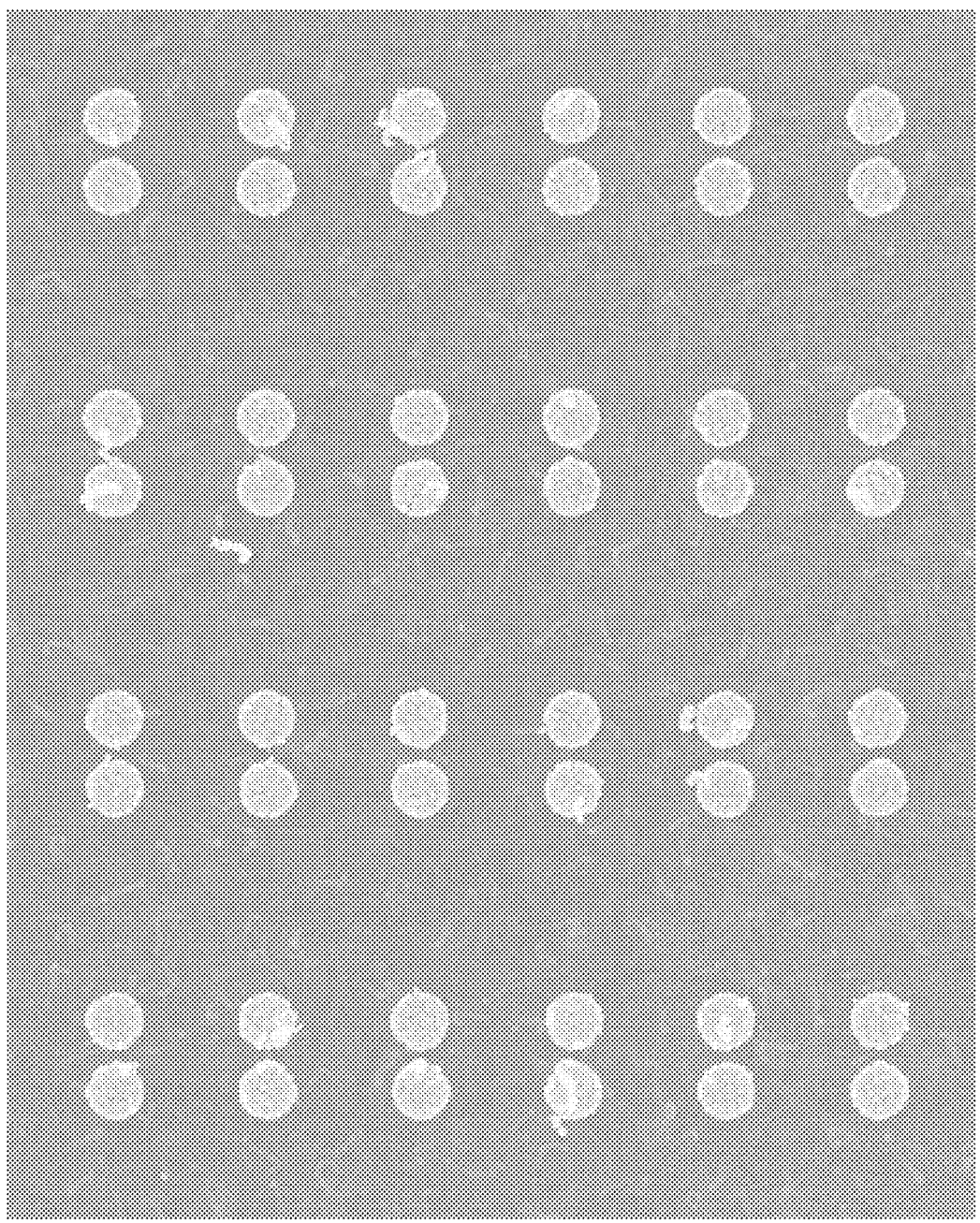
Figure 11:
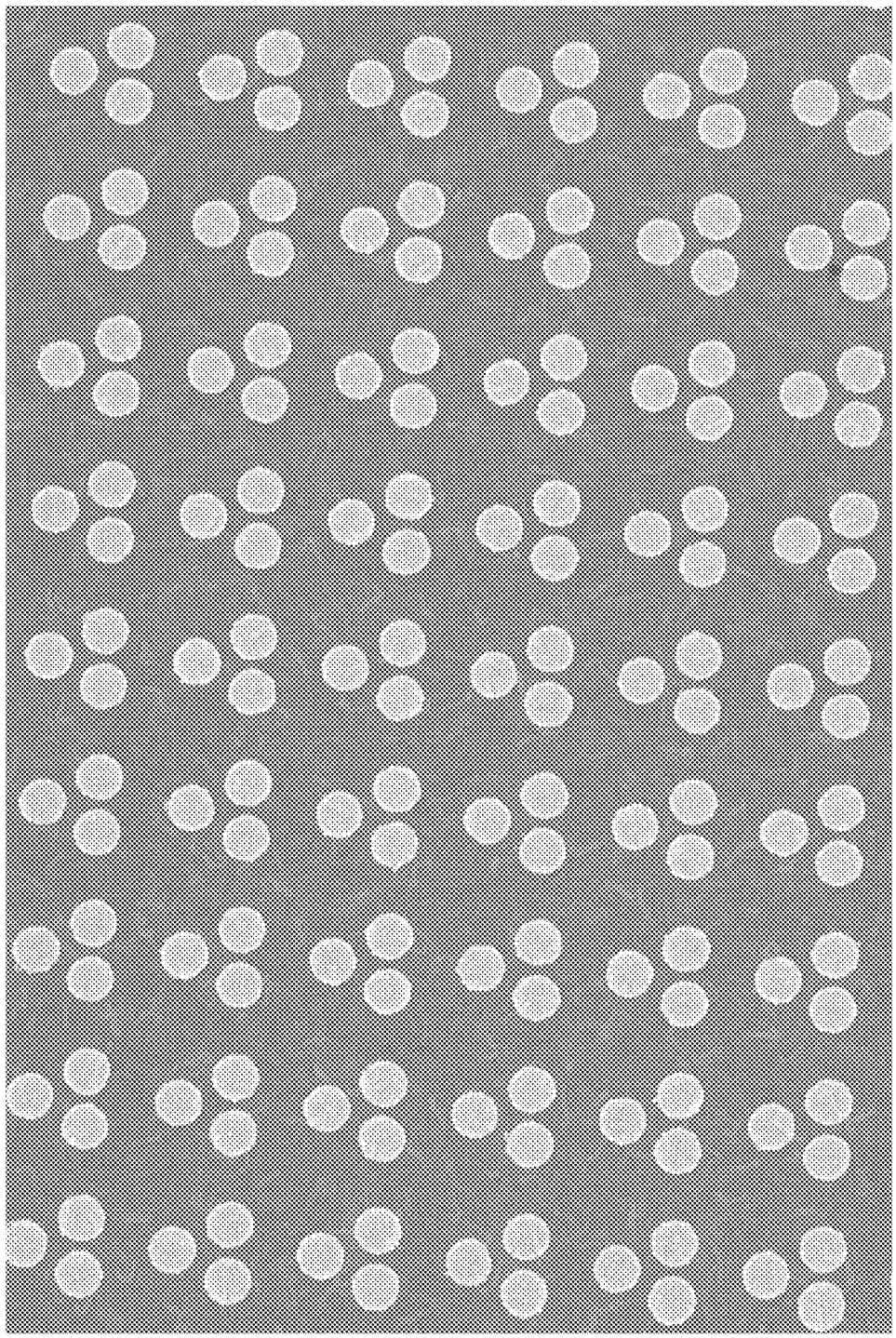
Figure 12:
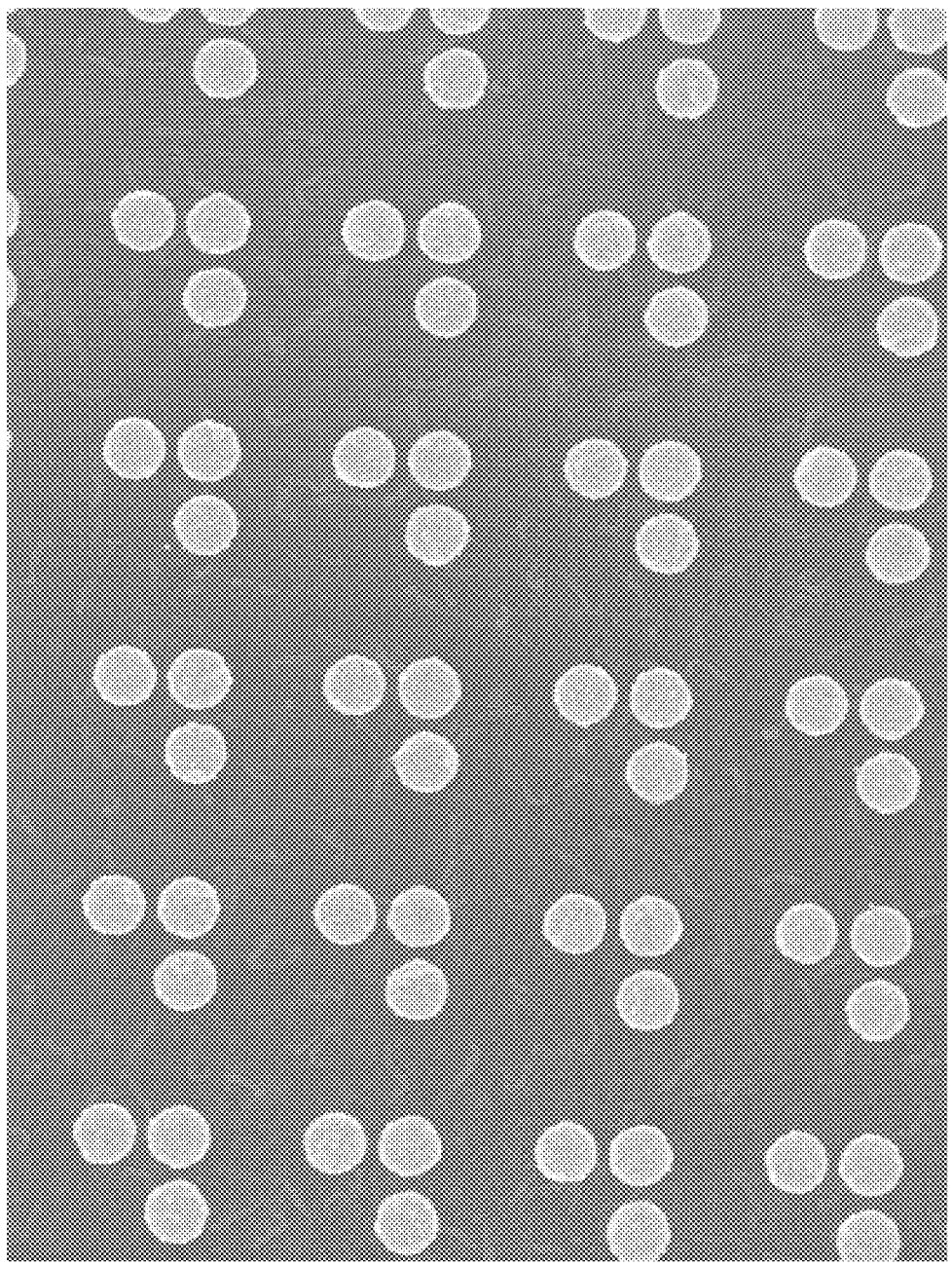

Other examples of nanosized metal particle arrays are depicted in the SEM photographs of FIGS. 10-12. In these embodiments, linearly extending rows of particles are aligned and combine with each other to form an array, where each linearly extending row of particles includes a plurality of particle sets. Each particle set forms a sub-array of particles within the larger array of the sets of particles (i.e., arrays within arrays of particles are formed). Referring to FIG. 10, each set of particles in a linearly extending row includes two round or circular shaped particles arranged in close proximity to each other, where the particles in the set are arranged and spaced a distance from each other that is less than the distance from each particle in the same set in relation to particles from other sets.

The array depicted in FIG. 11 includes sets of three particles arranged in a triangular shaped pattern within each set, where each particle in each set is spaced the same distance from all other particles in the set. The array depicted in FIG. 12 also includes sets of three particles but with a different arrangement than that which is depicted in FIG. 11. In particular, the particles in each set are not spaced the same distance from each other. However, a distance between each particle of each set for the arrays of FIGS. 11 and 12 is less than a distance between any particle in one set in relation to any particle in another set. The particles can be arranged in any suitable configuration within the set so as to form an array of the sets of particles that is symmetrical or asymmetrical. In addition, while the particles shown in the arrays of FIGS. 10-12 have circular shapes, the particles can also be formed having any other suitable shapes (e.g., polygonal shaped, irregular shaped, spiral shaped, S-shaped, etc.)

Figure 13:
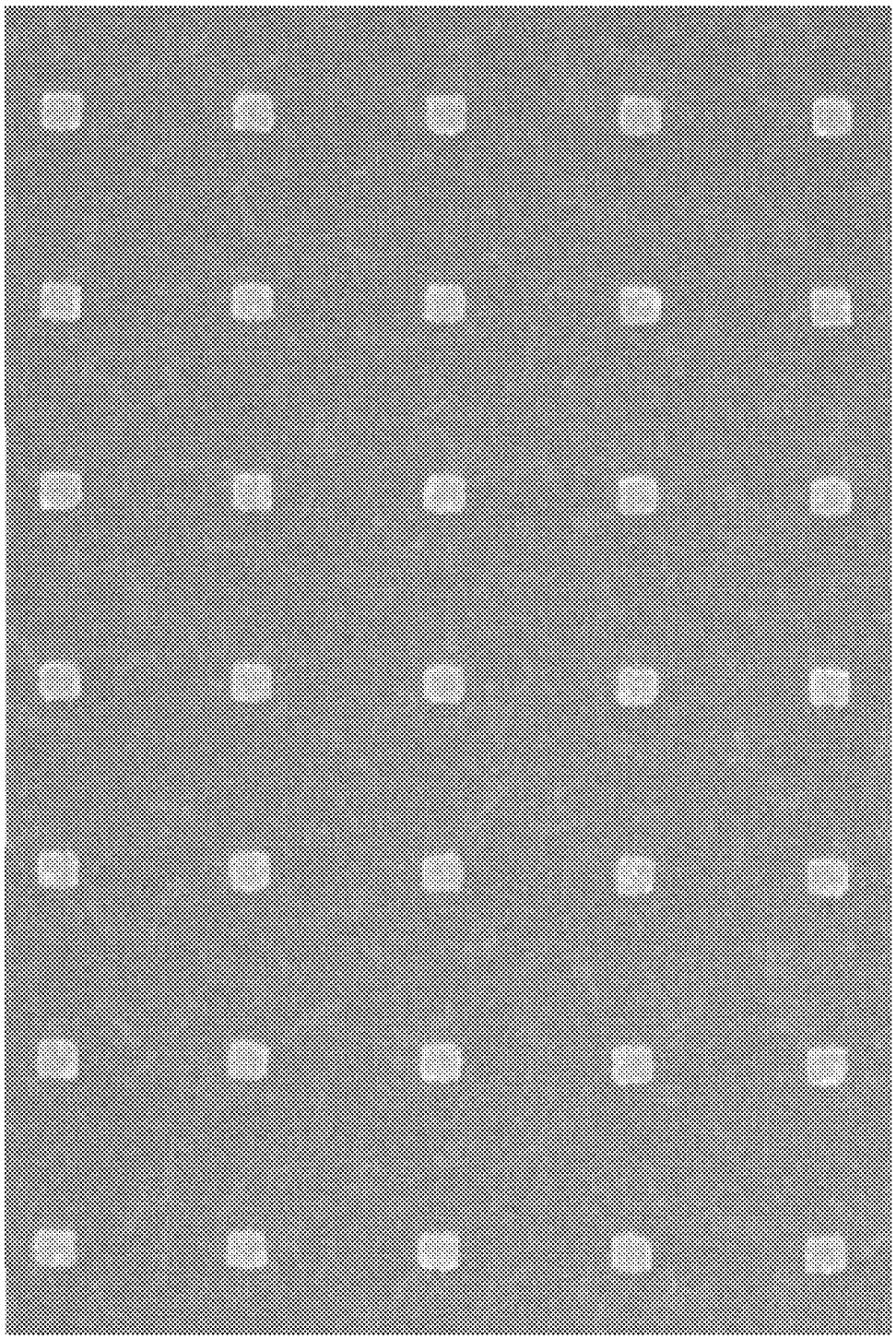
Figure 14:
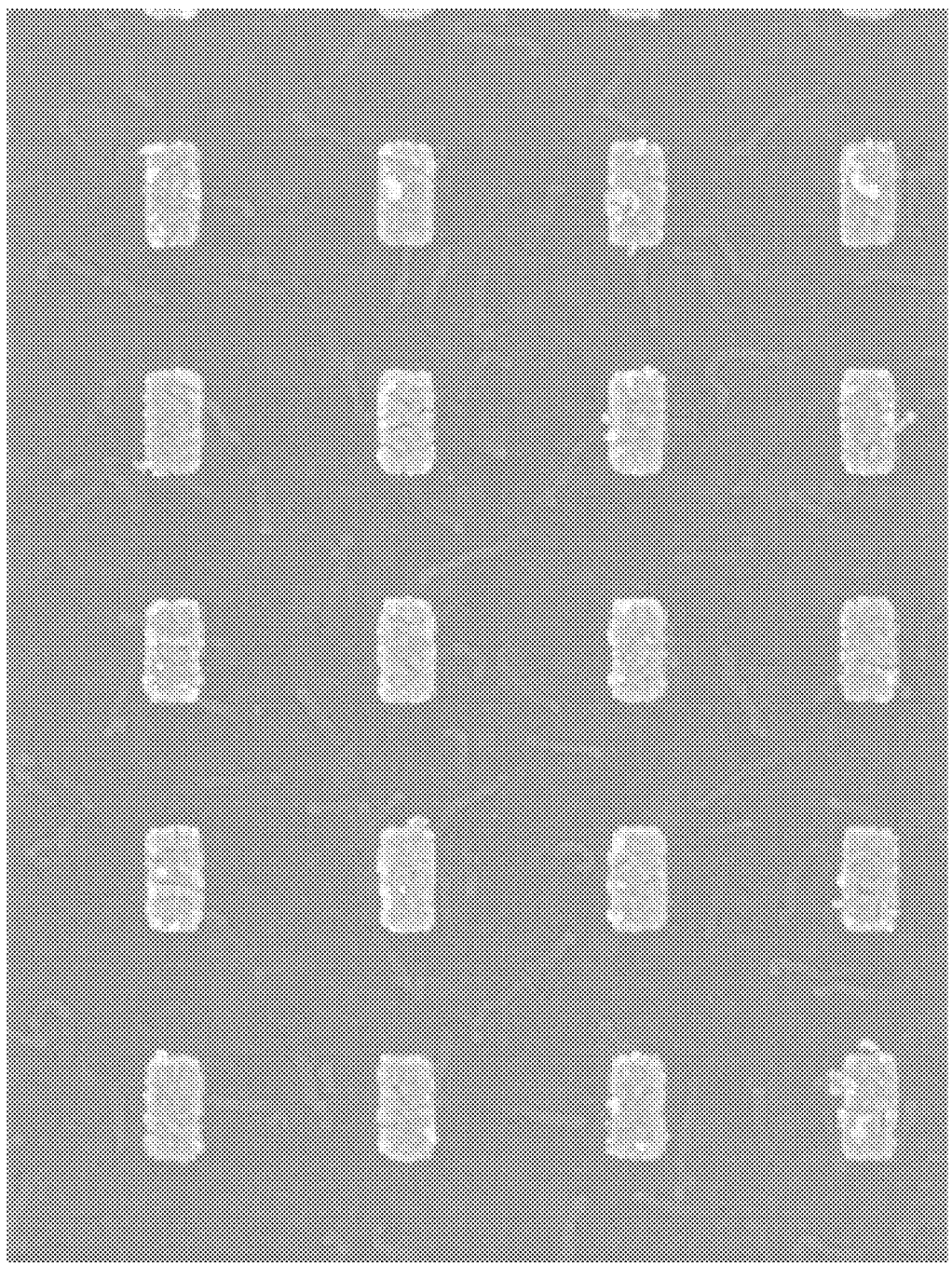

Arrays of metal particles having square and rectangular shapes are depicted in FIGS. 13 and 14. The square shaped particles of FIG. 13 have length and width dimensions of about 100 nm. The rectangular shaped particles of FIG. 14 have length dimensions of about 50 nm to about 200 nm and width dimensions of about 100 nm to about 200 nm. The FIB and EB lithography process can also be used to form metal particles having a variety of different polygonal shapes (e.g., triangular, quadrilaterial, pentagonal, hexagonal, etc.).

Figure 15:
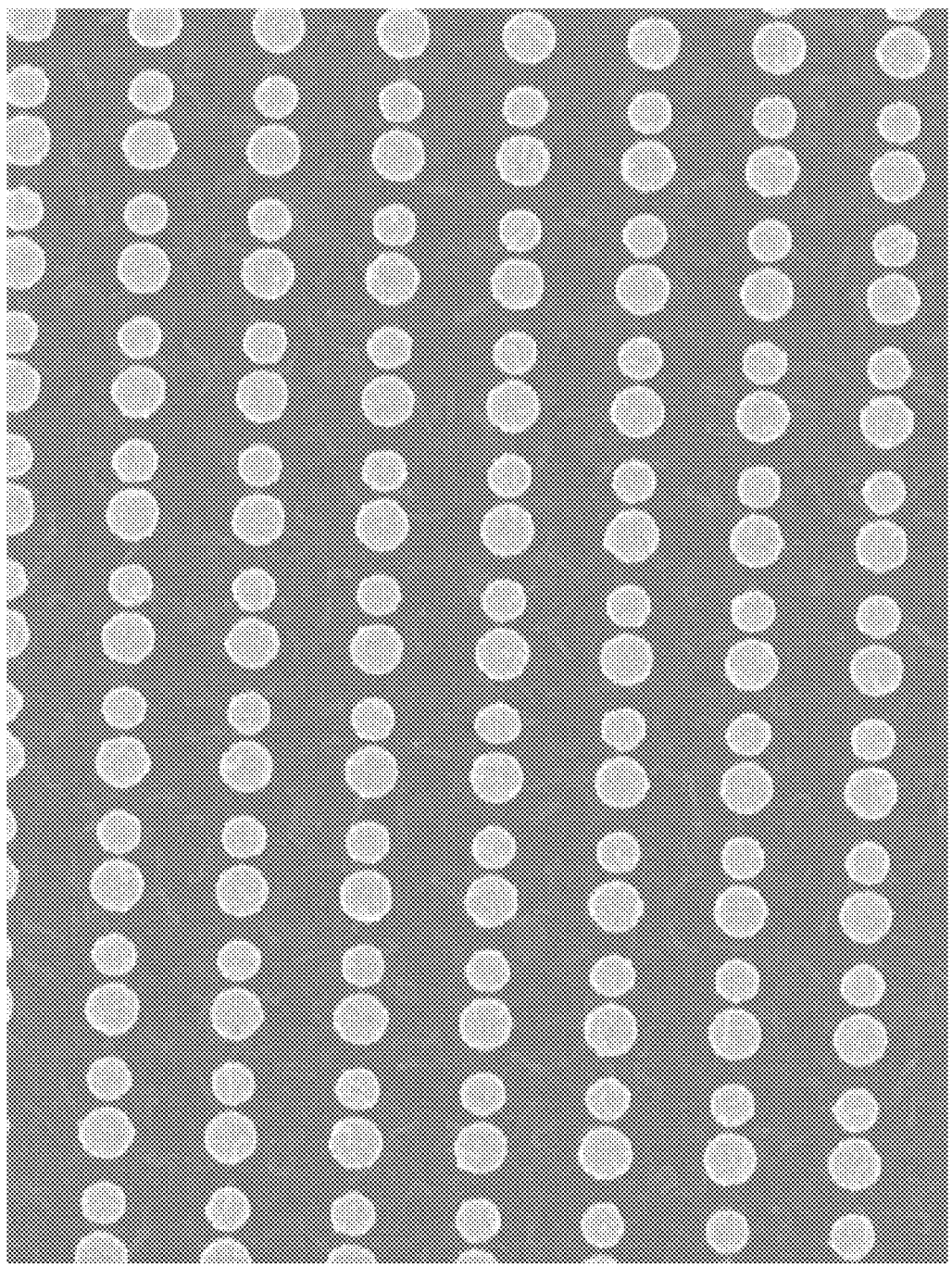

In addition, metal particles can be formed in an array having a plurality of different shapes and/or sizes. As shown in FIG. 15, an array includes sets of circular shaped particles having different dimensions, where one particle in each set has a larger diameter than the other particle in the set. The ratios of dimensions range from 1:2 to 1:5. Each set of particles includes two particles spaced closer to each other in relation to particles of the other sets forming the array (i.e., the distance between two particles of a set is less than the distance between any particle of one set in relation to any other particle of another set).

Figure 16:
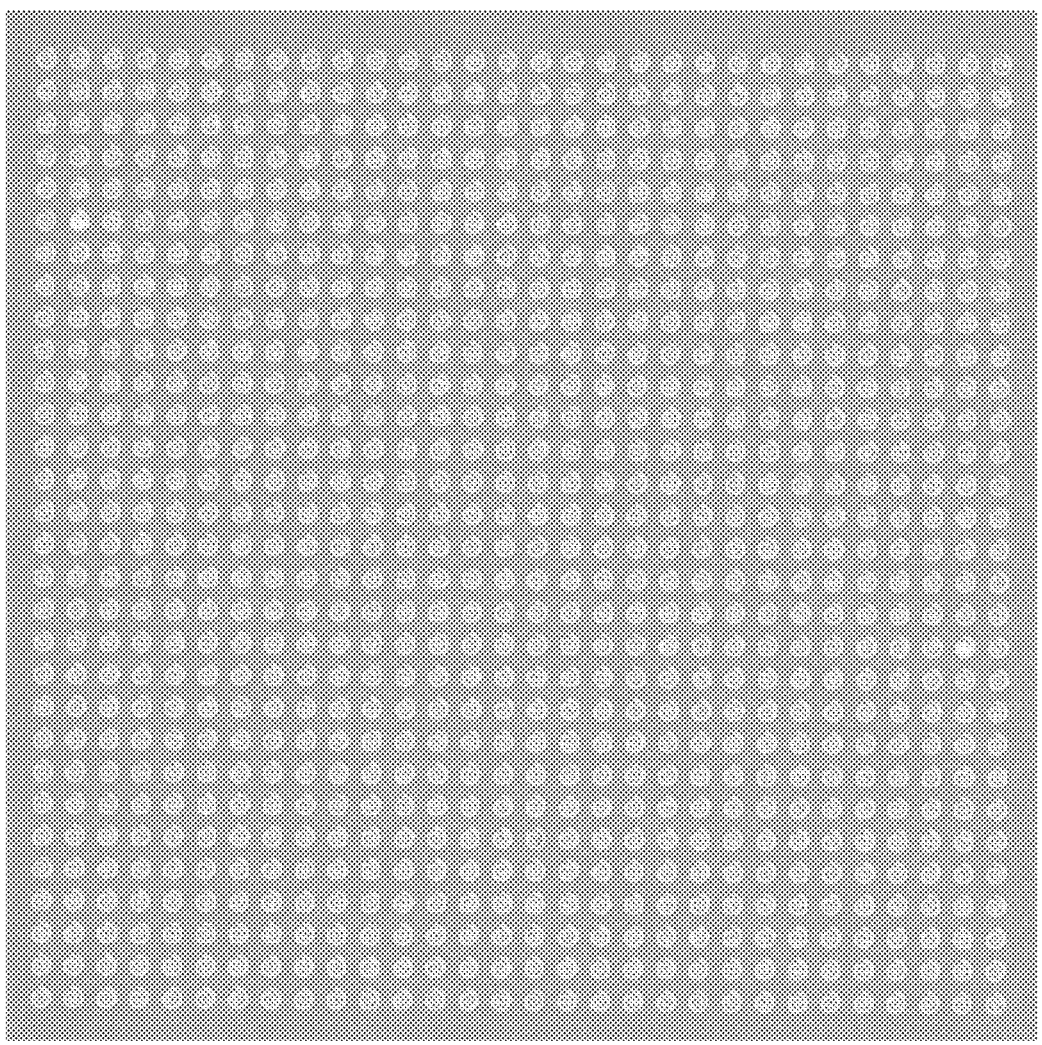
Figure 17:
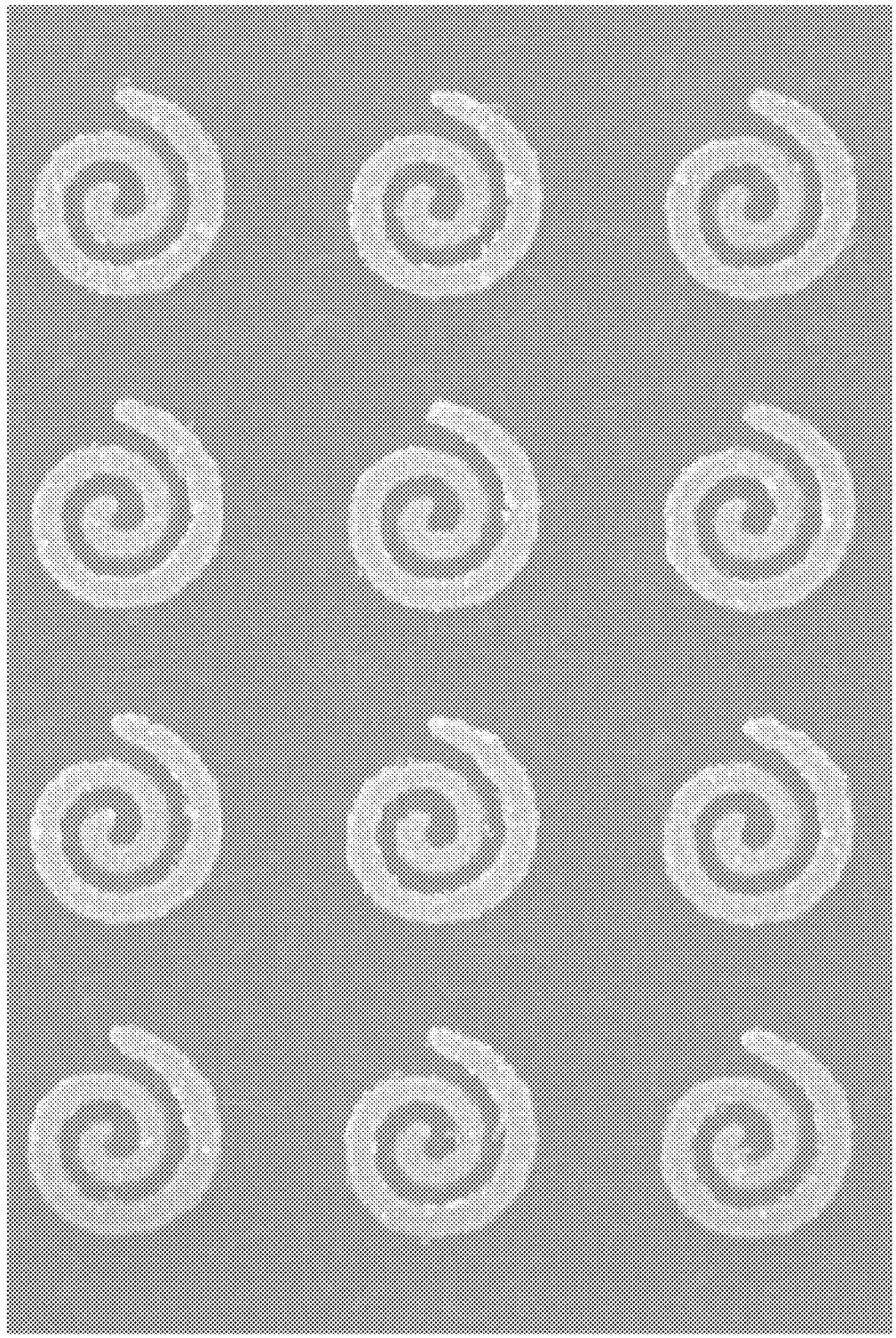

As can be seen in FIGS. 16 and 17, spiral shaped particles form an array of metal particles. In FIG. 16, a 30×30 array of particles is depicted, where each particle has a spiral shaped pattern as can be seen in the magnified view of FIG. 17. In particular, each particle includes a segment that spirals from an outer portion to an inner portion of the particle, and the diameter or dimension of each particle is about 150-400 nm, depending on the number of turns in the spirals. While the spiral shaped particles of FIGS. 16 and 17 have a generally rounded outer configuration, it is noted that the spiral pattern for each particle can also be formed such that the particle has any other outer geometric shape (e.g., polygon shaped).

The previously described embodiments of arrays of metal particles are just some of the non-limiting examples of a variety of different arrays that can be formed. Metal particles can be formed within an array have the same or different (i.e., mixed) geometric shapes, sizing and/or spacings. All of these different formed arrays can influence the "tuning" of the wavelength range at which the optical limiting structure is capable of blocking or substantially limiting light at particular wavelengths so as to achieve a shift of the wavelength blocking or limiting properties of the layered optical limiting structure to at least about 150 nm (preferably at least about 250 nm) and as much as about 2500 nm. In addition, the "tuning" of the optical limiting structure can be tuned to a specific wavelength (such as 532 nm or any other desired wavelength) with a narrow spectral linewidth of 1 nm or less.

Figure 18:
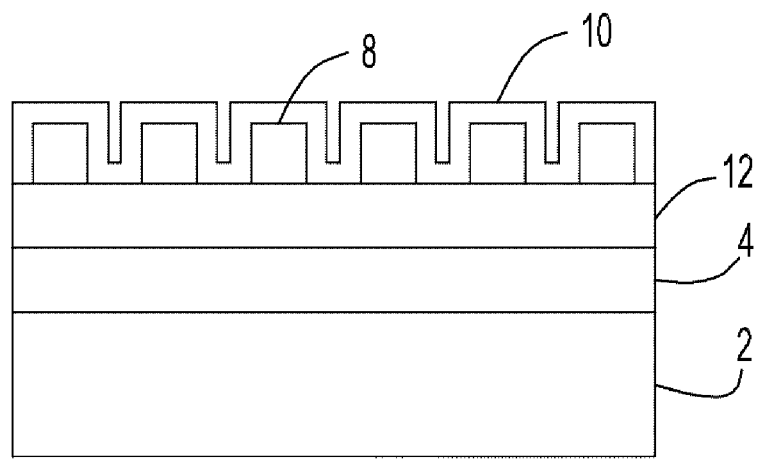
FIG. 18 depicts an optical limiting structure in accordance with another embodiment of the present invention.

In addition, as noted above, optical limiting structures can be formed with multiple phase-change material layers and/or multiple metal layers. In an example embodiment shown in FIG. 18, an optical limiting structure formed in a manner similar to the structure shown in FIG. 6 further includes an additional phase-change material layer 12 that is deposited over ITO layer 4 prior to formation of the metal layer 8 comprising the array of nanosized metal particles. Thus, the metal layer 8 is disposed or "sandwiched" between first and second phase-change material layers 10 and 12. It is noted that the first phase-change material layer 10 can be formed with the same or different phase-change materials used to form the second thermochromic layer 12.

The optical limiting structures can be rapidly switched between different optically transmissive states to achieve the light blocking or filtering features of the structures. For example, an optical limiting structure including a thermochromic material can be rapidly switched between a first optical state and a second optical state by heating of a thermochromic material in the optical limiting structure via any suitable heating source. A resistive heating source can be used to apply heat to the optical limiting structure (e.g., by applying an electric current to the structure) in order to switch the optical limiting structure from being transparent or allowing transmittance of light at a particular wavelength (or range of wavelengths) to being opaque or substantially limiting the transmittance of the light at the same wavelength (or range of wavelengths).

Figure 19:
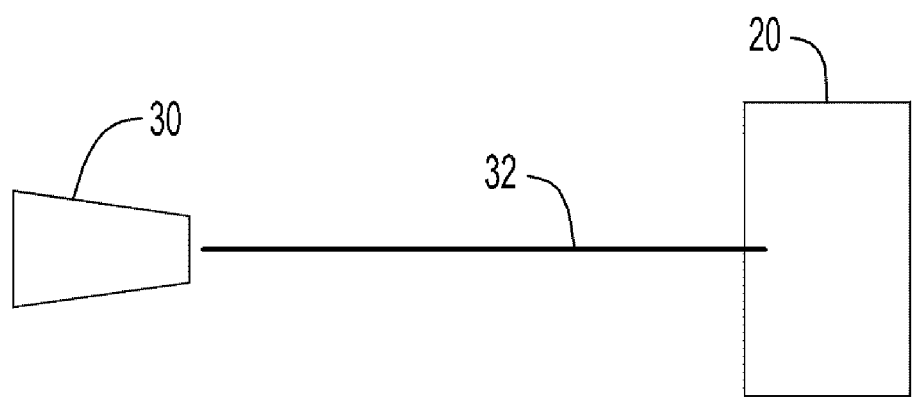
FIG. 19 depicts an optical limiting device including an optical limiting structure and a heat source in the form of a laser that provides energy to heat the optical limiting structure.

Alternatively, light energy in the form of a laser beam can be applied to the optical limiting structure to achieve rapid optical switching of the structure. An example embodiment is depicted in FIG. 19, in which a laser light source 30 directs a beam of light 32 toward an optical limiting structure 20 formed in accordance with the invention, where the light beam achieves a switch in optical states of the phase-change material layer of the structure 20 (e.g., by heating a thermochromic material in the phase-change material layer above the critical temperature of the thermochromic material so as to switch the optical properties of the structure).

The optical limiting structures of the invention can further be designed to rapidly transition between different optical states so as to act as an optical shutter. As noted above, the optical limiting devices can be configured differently by adjusting a variety of different variables (e.g., selection of phase-change materials and/or metal materials, metal particle sizes and array designs, layer thicknesses, doping of the phase-change materials, etc.) so as to provide the optical limiting devices with selected optical properties (e.g., the tuning of the wavelength band over which the device limits transmittance, controlling the contrast of the device) and the light or heat energy required to switch the device into different optical states. For example, optical shutters can be formed in accordance with the invention in which the time in which the optical limiting structure can be switched between "off" and "on" states (i.e., between a state at which light at a specified wavelength is transmitted through the optical limiting structure and a state at which transmittance of light at the specified wavelength is substantially limited) is on the order of microseconds (e.g., as low as 1 microsecond or less to switch from the "off" state to the "on" state). In addition, the optical shutters can be designed in accordance with the invention in which the optical contrast between the switched "off" and "on" states is at least about 1000:1. The optical shutters can further be designed for large aperture switching, for example, to switch large apertures having areas of 1 cm$^2$ and larger between "off" and "on" configurations.

Optical limiting structures of the present invention can be used to form a variety of different devices requiring blocking or limiting of light at different wavelengths. Examples of different types of devices in which the optical limiting structures can be implemented include, without limitation, windshield or windows for aircraft, automobiles, or other mobile vehicles, goggles, glasses or other protective face or eye shields, telescope or microscope devices, high speed optical shutter components for use in cameras or other high speed photography devices, LIDAR (light detection and ranging) devices, hologram devices (e.g., using an optical switch to cyclically alter an existing hologram or cyclically regenerate a hologram), military devices (e.g., night vision devices), and satellite or other aerospace devices.

In one example embodiment, an optical limiting structure can be implemented within a night vision device as an optical screen that selectively blocks or significantly limits the transmittance of green light, or light at wavelengths ranging from about 500 nm to about 570 nm, by the night vision device. This is useful, e.g., in applications in which intense green light from the night vision device (e.g., due to a large explosion or laser light directed at a user that could temporarily blind the user) Implementing the optical limiting device of the invention within a night vision device would act as screen to block such intense light prior to the user being blinded or impacted by the intense light, but still allow the user to see other (less bright) green lights (e.g., heads-up displays and radar landing lights for aerial applications).

Having described example embodiments of an optical limiting structure or device and methods of forming the optical limiting structure, variations and changes will be suggested to those skilled in the art in view of the teachings set forth herein. It is therefore to be understood that all such variations, modifications and changes are believed to fall within the scope of the present invention as defined by the appended claims.

What is claimed:

1. An optical limiting structure comprising:
a metal layer comprising at least one metal particle, the at least one metal particle having a size no greater than about 1000 nanometers; and
a phase-change material layer disposed adjacent at least a portion of the metal layer, the phase-change material layer comprising a phase-change material;
wherein optical properties of the optical limiting structure are modified in relation to optical properties of the phase-change material prior to integration into the optical limiting structure such that, in response to the optical limiting structure transitioning from a first optical state to a second optical state, the optical limiting structure substantially limits transmittance of light of at least one wavelength through the optical limiting structure at the second optical state, the at least one wavelength at which the optical limiting structure substantially limits transmittance of light is different from any wavelength of light at which transmittance is substantially limited through the phase-change material prior to integration into the optical limiting structure, and the optical limiting structure substantially limits tranmittance of light having wavelengths from about 500 nm to about 570 nm at the second optical state.

2. An optical limiting structure comprising:
a metal layer comprising a plurality of metal particles spaced from each other and forming an array, the metal particles having sizes no greater than about 1000 nanometers; and
a phase-change material layer disposed adjacent at least a portion of the metal layer, the phase-change material layer comprising a phase-change material that transitions from a first optical state to a second optical state, wherein transmittance of light at one or more wavelengths through the phase-change material is lower at the second optical state in relation to the first optical state, and the phase-change material layer comprises portions of phase-change material that are formed over one or more metal particles of the metal layer such that one or more spaces between metal particles of the metal layer remain uncovered by phase-change material;
wherein the optical limiting structure is configured to transition from a first optical state to a second optical state, with transmittance of light at a second wavelength through the optical limiting structure being lower at the second optical state of the optical limiting structure in relation to the first optical state of the optical limiting structure, and the second wavelength is different from each wavelength at which the phase-change material exhibits lower transmittance when transitioning from the first optical state of the phase-change material to the second optical state of the phase-change material.

3. The structure of claim 2, wherein the phase-change material comprises at least one of $VO_2$, $V_2O_3$, $Ti_2O_3$, $NiS_{2-y}Se_y$, $LaCoO_3$, $PrNiO_3$, $Cd_2Os_2O_7$, $NdNiO_3$, $Tl_2Ru_2O_7$, $NiS$, $BaCo_{1-y}Ni_yS_2$, $Ca_{1-y}Sr_yVO_3$, $PrRu_4P_{12}$, $BaVS_3$, $EuB_6$, $Fe_3O_4$, $La_{1-y}Ca_yMnO_3$, $La_{2-2y}Sr_{1+2y}Mn_2O_7$, $Ti_4O_7$ and La$_2$NiO$_4$, where y≦1, an azobenzene-containing polydiacetylene, polyvinylidene fluoride, polyvinyl acetate, polyvinyl phenylene, polystyrene sulfonate, and a polyaniline doped into opal nanostructures.

4. The structure of claim 2, wherein the phase-change material comprises a thermochromic material that is doped with at least one of tungsten, fluorine, titanium and chromium.

5. The structure of claim 2, wherein the metal particles of the metal layer comprise at least one of gold, platinum, palladium, silver, copper and aluminum.

6. The structure of claim 2, wherein the phase-change material layer has a thickness ranging from about 10 nanometers to about 50 nanometers.

7. The structure of claim 2, wherein at least some of the metal particles within the metal layer have cross-sectional dimensions ranging from about 20 nanometers to about 250 nanometers.

8. The structure of claim 2, wherein the second wavelength is within a range from about 250 nanometers to about 2500 nanometers.

9. The structure of claim 2, wherein the phase-change material comprises VO$_2$.

10. The structure of claim 9, wherein the second wavelength is at least about 250 nm less than each wavelength at which the phase-change material exhibits lower transmittance when transitioning from the first optical state of the phase-change material to the second optical state of the phase-change material.

11. The structure of claim 9, wherein the second wavelength is within a range from about 500 nanometers to about 570 nanometers.

12. The structure of claim 2, further comprising:
a second phase-change material layer comprising a phase-change material;
wherein the metal layer is disposed between the phase-change material layers.

13. The structure of claim 2, wherein the array of metal particles includes metal particles having different shapes.

14. The structure of claim 2, wherein the array of metal particles includes metal particles having non-round shapes.

15. The structure of claim 2, wherein the array of metal particles includes particles having polygon shapes.

16. The structure of claim 2, wherein the array of metal particles includes metal particles having spiral shapes.

17. The structure of claim 2, wherein the array of metal particles includes metal particles having different dimensions.

18. The structure of claim 2, wherein the array of metal particles includes a plurality of rows of metal particles, wherein each metal particle in a corresponding row is spaced a distance to at least one other metal particle in the corresponding row that is smaller than a distance between a metal particle in the corresponding row and any other metal particle in other rows.

19. The structure of claim 2, wherein the array of metal particles includes sets of metal particles including at least two metal particles, wherein the metal particles in a corresponding set are spaced a distance from each other that is shorter than any distance between each metal particle in the corresponding set and any other metal particle in another set.

20. The structure of claim 19, wherein at least one set of metal particles includes at least three metal particles.

21. An optical limiting device comprising:
the optical limiting structure of claim 2; and
a heat or light source configured to subject the phase-change material layer to at least one of heat and light so as to induce a change in the phase-change material layer between the first and second optical states of the phase-change material layer.

22. A method of providing an optical limiting structure, the method comprising:
providing a metal layer comprising a plurality of metal particles spaced from each other and forming an array, the metal particles having sizes no greater than about 1000 nanometers; and
depositing a phase-change material layer over at least a portion of the metal layer, the phase-change material layer comprising a phase-change material that transitions from a first optical state to a second optical state, wherein transmittance of light at one or more wavelengths through the phase-change material is lower at the second optical state in relation to the first optical state, and the phase-change material layer comprises portions of phase-change material that are formed over one or more metal particles of the metal layer such that one or more spaces between metal particles of the metal layer remain uncovered by phase-change materilal;
wherein the optical limiting structure transitions from a first optical state to a second optical state, with transmittance of light at a second wavelength through the optical limiting structure being lower at the second optical state of the optical limiting structure in relation to the first optical state of the optical limiting structure, and the second wavelength is different from each wavelength at which the phase-change material exhibits lower transmittance when transitioning from the first optical state of the phase-change material to the second optical state of the phase-change material.

23. The method of claim 22, wherein the providing a metal layer further comprises:
forming a mask on a substrate;
processing the mask so as to form a pattern of voids in the mask;
depositing a metal material within the voids of the mask; and
removing the mask so as to form the array of metal particles spaced from each other.

24. The method of claim 23, wherein the processing of the mask comprises one of a focused ion beam lithography technique and an electron beam lithography technique.

25. The method of claim 22, wherein the metal layer is formed on a substrate comprising a layer of indium tin oxide upon which the metal layer is deposited.

26. The method of claim 22, wherein the phase-change material comprises at least one of VO$_2$, V$_2$O$_3$, Ti$_2$O$_3$, NiS$_{2-y}$Se$_y$, LaCoO$_3$, PrNiO$_3$, Cd$_2$Os$_2$O$_7$, NdNiO$_3$, Tl$_2$Ru$_2$O$_7$, NiS, BaCo$_{1-y}$Ni$_y$S$_2$, Ca$_{1-y}$Sr$_y$VO$_3$, PrRu$_4$P$_{12}$, BaVS$_3$, EuB$_6$, Fe$_3$O$_4$, La$_{1-y}$Ca$_y$MnO$_3$, La$_{2-2y}$Sr$_{1+2y}$Mn$_2$O$_7$, Ti$_4$O$_7$ and La$_2$NiO$_4$, where y≦1, an azobenzene-containing polydiacetylene, polyvinylidene fluoride, polyvinyl acetate, polyvinyl phenylene, polystyrene sulfonate, and a polyaniline doped into opal nanostructures.

27. The method of claim 22, further comprising:
depositing a dopant within the phase-change material, wherein the dopant comprises at least one of tungsten, fluorine, titanium and chromium.

28. The method of claim 22, wherein the metal particles of the metal layer comprise at least one of gold, platinum, palladium, silver, copper and aluminum.

29. The method of claim 22, wherein the second wavelength is about 532 nanometers±30 nanometers.

30. The method of claim 22, wherein the array of metal particles includes metal particles having non-round shapes.

31. The method of claim 22, wherein the array of metal particles includes sets of metal particles including at least two metal particles, wherein the metal particles in a corresponding set are spaced a distance from each other that is shorter than any distance between each metal particle in the corresponding set and any other metal particle in another set.

32. A method of using an optical limiting device, the optical limiting device comprising a metal layer comprising a plurality of metal particles spaced from each other and forming an array, the metal particles having sizes no greater than about 1000 nanometers, and a phase-change material layer disposed adjacent at least a portion of the metal layer, the phase-change material layer comprising a phase-change material, the phase-change material being configured to transition from a first optical state to a second optical state, wherein transmittance of light at one or more wavelengths through the phase-change material is lower at the second optical state in relation to the first optical state, and the phase-change material layer comprises portions of phase-change material that are formed over one or more metal particles of the metal layer such that one or more spaces between metal particles of the metal layer remain uncovered by phase-change material the method comprising:
  subjecting the optical limiting device to at least one of a heat source and a light source so as to transition the optical limiting structure from a first optical state to a second optical state;
  wherein transmittance of light at a second wavelength through the optical limiting structure is lower at the second optical state of the optical limiting structure in relation to the first optical state of the optical limiting structure, and the second wavelength is different from each wavelength at which the phase-change material exhibits lower transmittance when transitioning from the first optical state of the phase-change material to the second optical state of the phase-change material.

* * * * *

UNITED STATES PATENT AND TRADEMARK OFFICE
CERTIFICATE OF CORRECTION

| | |
|---|---|
| PATENT NO. | : 8,259,381 B2 |
| APPLICATION NO. | : 12/479311 |
| DATED | : September 4, 2012 |
| INVENTOR(S) | : Anthony Bresenhan Kaye et al. |

Page 1 of 1

It is certified that error appears in the above-identified patent and that said Letters Patent is hereby corrected as shown below:

Column 12, line 32, replace "limits tranmittance" with -- limits transmittance --; and Column 14, line 21, replace "phase-change materilal" with -- phase-change material --.

Signed and Sealed this
First Day of January, 2013

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 8,259,381 B2 |
| APPLICATION NO. | : 12/479311 |
| DATED | : September 4, 2012 |
| INVENTOR(S) | : Anthony Bresenhan Kaye et al. |

It is certified that error appears in the above-identified patent and that said Letters Patent is hereby corrected as shown below:

On the front page of the Patent, Section (73) Assignee: please insert -- Vanderbilt University, Nashville, TN (US) --.

Signed and Sealed this
Nineteenth Day of March, 2013

Teresa Stanek Rea
*Acting Director of the United States Patent and Trademark Office*